United States Patent
Bouchet et al.

(10) Patent No.: US 12,330,444 B2
(45) Date of Patent: Jun. 17, 2025

(54) CERAMIC WRITING BALL

(71) Applicant: SOCIÉTÉ BIC, Clichy (FR)

(72) Inventors: Julien Bouchet, Clichy (FR); Ghislain Alves, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 0 days.

(21) Appl. No.: 18/575,089

(22) PCT Filed: Jun. 27, 2022

(86) PCT No.: PCT/EP2022/067527
§ 371 (c)(1),
(2) Date: Dec. 28, 2023

(87) PCT Pub. No.: WO2023/274934
PCT Pub. Date: Jan. 5, 2023

(65) Prior Publication Data
US 2024/0336083 A1  Oct. 10, 2024

(30) Foreign Application Priority Data
Jun. 30, 2021 (EP) .................... 21305900

(51) Int. Cl.
*B43K 1/08* (2006.01)
*C04B 35/48* (2006.01)
*C04B 35/626* (2006.01)
*C04B 35/64* (2006.01)

(52) U.S. Cl.
CPC .............. *B43K 1/082* (2013.01); *C04B 35/48* (2013.01); *C04B 35/62675* (2013.01); *C04B 35/64* (2013.01); *C04B 2235/3208* (2013.01); *C04B 2235/3217* (2013.01); *C04B 2235/3225* (2013.01); *C04B 2235/3229* (2013.01); *C04B 2235/3244* (2013.01); *C04B 2235/604* (2013.01); *C04B 2235/612* (2013.01); *C04B 2235/6567* (2013.01); *C04B 2235/77* (2013.01); *C04B 2235/963* (2013.01)

(58) Field of Classification Search
CPC ... B43K 1/082; C04B 35/48; C04B 35/62675; C04B 35/64
See application file for complete search history.

(56) References Cited

U.S. PATENT DOCUMENTS

| | | | |
|---|---|---|---|
| 4,621,936 A | 11/1986 | Hansson et al. | |
| 4,742,030 A * | 5/1988 | Masaki | A61K 6/818 423/608 |
| 5,980,765 A | 11/1999 | Machida et al. | |
| 9,533,528 B2 * | 1/2017 | Osano | B43K 1/082 |
| 2015/0078803 A1 | 3/2015 | Osano et al. | |

FOREIGN PATENT DOCUMENTS

| | | |
|---|---|---|
| IN | 408729 A | 6/2016 |
| IN | 349658 A1 | 3/2018 |
| JP | S59135195 A | 8/1984 |
| JP | 2001287490 A | 10/2001 |
| WO | 2019049247 A1 | 3/2019 |

OTHER PUBLICATIONS

Search Report and Written Opinion issued in International Application No. PCT/EP2022/067527, mailed on Sep. 16, 2022.

* cited by examiner

*Primary Examiner* — Jennifer C Chiang
(74) *Attorney, Agent, or Firm* — Bookoff McAndrews, PLLC

(57) ABSTRACT

A system may include a writing instrument. The writing instrument may include a ceramic writing ball. The ceramic writing ball may include, relative to the total weight of the ceramic writing ball, about 1.0 wt.-% to about 14.6 wt.-% of one or more metal oxides selected from $Y_2O_3$, HfO, MgO, CaO and/or $Ce_2O_3$, and about 0.15 wt.-% to about 3.0 wt.-% $Al_2O_3$, and $ZrO_2$ as balance.

20 Claims, No Drawings

CERAMIC WRITING BALL

CROSS-REFERENCE TO RELATED APPLICATIONS

This is a National Stage Application under 35 U.S.C. § 371 of International Application No. PCT/EP2022/067527, filed on Jun. 27, 2022, now published as WO 2023/274934 A1, which claims priority to European Application No. 21305900.9, filed on Jun. 30, 2021, the entire contents of which is incorporated herein by reference.

TECHNICAL FIELD

The present disclosure relates to the field of writing devices. More specifically, the present disclosure relates to writing devices comprising writing balls.

BACKGROUND

Writing instruments such as rollerball or ball-point pens commonly comprise writing balls. Writing balls are usually small hard spheres made of steel. The writing ball is typically held between the ink outlet and the socket and usually protrudes a little from the ink outlet. Writing instruments, such as ballpoint pens, are designed to use the rotation of the writing ball within the socket during writing to apply a material or a liquid, for example ink, to a surface. The rotation of the ball is commonly generated by the combination of the force with which the user applies the pen on the writing surface and the writing movement.

Writing balls are mass-produced items, so mass-production related properties of the writing balls (such as machinability) and their cost, including energy costs, are relevant. Furthermore, writing balls are subjected to forces during the writing action, e.g., the force pressing the writing instrument against the writing surface, and therefore their mechanical properties are relevant as well. Moreover, a common problem with writing instruments comprising writing balls is corrosion. In particular, writing balls made of steel used in rollerball pens may be prone to corrosion. While ballpoint pens usually dispense oil-based inks, rollerball pens commonly dispense water-based liquid or gel inks. It may not be possible to use the same type of writing ball for ballpoint and rollerball pens as the writing ball may not be corrosion resistant in both types of ink.

In the 1960s, writing balls made of tungsten carbide were introduced. Tungsten carbide writing balls may be more corrosion resistant compared to commonly used metal writing balls. However, writing balls made of tungsten carbide may require high temperatures for heat treatment, i.e., their production is energy intensive. Moreover, tungsten carbide writing balls may be very hard and hence require a longer time and more energy for grinding and polishing compared to softer materials. Further, tungsten carbide balls typically require the addition of cobalt. Cobalt and its salts may be toxic. The use of cobalt in writing instruments is thus a possible hazard for the user or the environment.

The present disclosure aims to address one or more of the problems in the prior art.

SUMMARY

According to a first aspect, the present disclosure relates to a writing instrument comprising a ceramic writing ball. The ceramic writing ball comprises relative to the total weight of the ceramic writing ball about 1.0 wt.-% to about 14.6 wt.-% of one or more metal oxides selected from $Y_2O_3$, HfO, MgO, CaO and/or $Ce_2O_3$. The ceramic writing ball may comprise about 0.15 wt.-% to about 3.0 wt.-% $Al_2O_3$. The ceramic writing ball may comprise $ZrO_2$ as balance.

In some embodiments the ceramic writing ball may comprise between about 1.0 wt.-% to about 14.6 wt.-% of $Y_2O_3$, more specifically between about 3.0 wt.-% to about 10 wt.-% $Y_2O_3$, and in particular between about 4 wt.-% to about 6 wt.-% $Y_2O_3$.

In some embodiments the ceramic writing ball may comprise between about 0.15 wt.-% to about 1.5 wt.-% of $Al_2O_3$, more specifically between about 0.15 wt.-% to about 0.7 wt.-% $Al_2O_3$, and in particular between about 0.15 wt.-% to about 0.35 wt.-% $Al_2O_3$.

In some embodiments the ceramic writing ball may have a specific surface area between about 4 $m^2/g$ to about 10 $m^2/g$, more specifically between about 5 $m^2/g$ to about 9 $m^2/g$ and in particular between about 6 $m^2/g$ to about 8 $m^2/g$.

In some embodiments the ceramic writing ball may comprise at least about 60 wt.-% $ZrO_2$, more specifically at least about 70 wt.-% $ZrO_2$ and in particular at least about 80 wt.-% $ZrO_2$.

In some embodiments the ceramic writing ball may comprise less than about 40 wt.-% $Si_3N_4$, more specifically less than about 20 wt.-% $Si_3N_4$ and in particular less than about 5 wt.-% $Si_3N_4$.

In some embodiments the ceramic writing ball may comprise less than about 40 wt.-% tungsten carbide, more specifically less than about 20 wt.-% tungsten carbide and in particular less than about 5 wt.-% tungsten carbide.

In some embodiments the ceramic writing ball may essentially consist or consist of the following elements: about 1.0 wt.-% to about 14.6 wt.-% of a metal oxide selected from $Y_2O_3$, HfO, MgO, CaO and/or $Ce_2O_3$, about 0.15 wt.-% to about 3.0 wt.-% $Al_2O_3$, other elements, if present, in an amount of up to about 10 wt.-%, more specifically up to about 5 wt.-% and in particular up to about 3 wt.-%; and $ZrO_2$ as balance.

In some embodiments writing ball may comprise or consist of the following elements: about 1.0 wt.-% to about 14.6 wt.-% of a metal oxide, about 0.15 wt.-% to about 3.0 wt.-% $Al_2O_3$, $SiO_2$, if present, in an amount of less than about 0.1 wt.-%, $Fe_2O_3$, if present, in an amount of less than about 0.1 wt.-%, $Na_2O$, if present, in an amount of less than about 0.1 wt.-%, other elements, if present, in an amount of less than about 3 wt.-%, and $ZrO_2$ as balance.

In some embodiments the ceramic writing ball may consist of the following elements: about 1.0 wt.-% to about 14.6 wt.-% of a metal oxide selected from $Y_2O_3$, HfO, MgO, CaO and/or $Ce_2O_3$, about 0.15 wt.-% to about 3.0 wt.-% $Al_2O_3$, $SiO_2$, if present, in an amount of less than about 0.1 wt.-%, $Fe_2O_3$, if present, in an amount of less than about 0.1 wt.-%, $Na_2O$, if present, in an amount of less than about 0.1 wt.-%, other elements, if present, in an amount of up to about 3 wt.-%; and $ZrO_2$ as balance.

In some embodiments the ceramic writing ball may consist of the following elements: about 1.0 wt.-% to about 14.6 wt.-%, more specifically about 3.0 wt.-% to about 10 wt.-%, and in particular about 4 wt.-% to about 6 wt.-%, of $Y_2O_3$; about 0.15 wt.-% to about 3.0 wt.-% $Al_2O_3$, $SiO_2$, if present, in an amount of less than about 0.1 wt.-%; $Fe_2O_3$, if present, in an amount of less than about 0.1 wt.-%; $Na_2O$, if present, in an amount of less than about 0.1 wt.-%; other elements, if present, in an amount of up to about 3 wt.-%; and $ZrO_2$ as balance.

In some embodiments the diameter of the ceramic writing ball may be between about 0.2 mm to about 2.5 mm, more specifically between about 0.4 mm to about 2.0 mm and in particular between about 0.6 mm to about 1.6 mm.

In some embodiments a surface of the ceramic writing ball may have a surface roughness Ra between about 1 nm to about 50 nm, more specifically between about 2 nm to about 30 nm, and in particular between about 10 nm to about 20 nm.

In some embodiments the ceramic writing ball may have a density between about 5.2 g/cm$^3$ to about 6.0 g/cm$^3$, more specifically 5.4 g/cm$^3$ to about 5.8 g/cm$^3$ and in particular between about 5.5 g/cm$^3$ to about 5.7 g/cm$^3$.

In some embodiments the ceramic writing ball may have a hardness between about 1200 HV1 to about 1600 HV1, more specifically 1300 HV1 to about 1500 HV1 and in particular between about 1370 HV1 to about 1430 HV1, according to the standard ISO 14705:2016.

In some embodiments the ceramic writing ball may comprise less than about 0.1 wt.-% $SiO_2$, more specifically less than about 0.05 wt.-% $SiO_2$, and in particular less than about 0.02 wt.-% $SiO_2$, relative to the total weight of the ceramic writing ball.

In some embodiments the ceramic writing ball may comprise less than about 0.1 wt.-% $Fe_2O_3$, more specifically less than about 0.05 wt.-% $Fe_2O_3$, and in particular less than about 0.01 wt.-% $Fe_2O_3$, relative to the total weight of the ceramic writing ball.

In some embodiments the ceramic writing ball may comprise less than about 0.1 wt.-% $Na_2O$, more specifically less than about 0.07 wt.-% $Na_2O$, and in particular less than about 0.04 wt.-% $Na_2O$, relative to the total weight of the ceramic writing ball.

In some embodiments the ceramic writing ball may be corrosion resistant to water-based liquids and in particular corrosion resistant to water-based inks.

In some embodiments the ceramic writing ball may be corrosion resistant to oil-based liquids and in particular corrosion resistant to oil-based inks.

In some embodiments the ceramic writing ball may be corrosion resistant to solvent-based liquid and in particular corrosion resistant to solvent-based inks.

According to a second aspect, the present disclosure relates to a process for manufacturing a ceramic writing ball. The process comprises pressing a powder mixture into a spherical shape to obtain a raw pellet. Subsequently, heating the raw pellet to a temperature between about 400° C. to about 750° C., more specifically between about 450° C. to about 700° C. and in particular between 500° C. to about 600° C., for about 1 to about 3 hours, more specifically for about 1.5 to about 2.5 hours, and in particular for about 1.8 to about 2.2 hours, to obtain a pre-sintered pellet.

The pre-sintered pellet is sintered at a temperature of between about 1300° C. to about 1550° C., more specifically between about 1400° C. to about 1500° C. and in particular between 1430° C. to about 1480° C., for about 1 to about 3 hours, more specifically for about 1.5 to about 2.5 hours, and in particular for about 1.8 to about 2.2 hours, to obtain a sintered pellet. The sintered pellet is ground to obtain a proto writing ball. The proto writing ball is polished to obtain a writing ball.

In some embodiments the powder mixture may have an average particle size about 0.1 μm and about 5 μm, more specifically between about 0.2 μm and about 1 μm and in particular between 0.4 μm and about 0.8 μm.

In some embodiments the powder mixture may have an average granule size of about 5 μm to about 300 μm, more specifically between about 10 μm to about 200 μm and in particular between 40 μm to about 80 μm.

In some embodiments the writing instrument may comprise a writing tip in which the ceramic writing ball is rotatably inserted.

In some embodiments the writing instrument may comprise an ink compartment.

In some embodiments the ink compartment may comprise an aqueous ink.

In some embodiments the ink compartment may comprise a non-aqueous ink.

In some embodiments the ink compartment may be in fluid connection with the ink outlet.

In some embodiments the ink compartment may be an ink cartridge, in particular a removable ink cartridge.

In some embodiments the writing instrument may comprise a cap.

In a third aspect, the present disclosure relates to a ceramic writing ball. The ceramic writing ball may comprise relative to the total weight of the ceramic writing ball about 1.0 wt.-% to about 14.6 wt.-% of a metal oxide selected from $Y_2O_3$, HfO, MgO, CaO and/or $Ce_2O_3$, about 0.15 wt.-% to about 0.35 wt.-% $Al_2O_3$, and $ZrO_2$ as balance.

DETAILED DESCRIPTION

Hereinafter, a detailed description will be given of the present disclosure. The terms or words used in the description and the aspects of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

The present disclosure relates to a writing instrument comprising a new type of ceramic writing ball based on a stabilized zirconium dioxide ceramic with added $Al_2O_3$. Writing balls are commonly rotatably inserted within the writing instrument. When the writing instrument is moved across a writing surface, e.g., a sheet of paper, the writing ball rotates. As the writing ball is usually in fluid contact with an ink stored in an ink compartment, it is wetted with ink on the side facing away from an ink outlet. When the side previously facing away from the ink outlet rotates into contact with the writing surface, the writing ball dispenses the ink on the writing surface.

As mentioned above, the writing balls in the present disclosure comprise stabilized zirconium dioxide. The zirconium dioxide, $ZrO_2$, is stabilized by metal oxides. Zirconium dioxide may also be referred to as zirconia. Without wishing to be bound by theory, it is believed that pure zirconium dioxide is present in a monoclinic crystal structure at room temperature. At temperatures above about 1200° C. it is possible to sinter zirconium dioxide powders to create objects, for example writing balls. Additionally or alternatively, at higher temperatures the zirconium dioxide may undergo a phase transformation to a tetragonal phase (at about 1173° C.) or cubic phase (at about 2370° C.). The tetragonal or cubic phase may have beneficial mechanical properties and may be referred to as high temperature phases.

Further, the phase changes from a monoclinic crystal structure to a cubic or tetragonal structure may be reversible when the ceramic is cooled. However, these phase changes may result in volume changes. For example, the phase change of zirconium dioxide tetragonal phase to a monoclinic crystal structure may result in a volume change of about 5%. These volume changes may introduce stress to the material which may lead to breakage of the writing ball, in particular during use or when shocked e.g., by dropping the pen.

The addition of metal oxides may fully or partly stabilize the high temperature phases of zirconium dioxide at room temperature. In particular, the addition of metal oxides may allow heating the zirconium dioxide to a temperature where it forms the tetragonal phase. When cooling down the metal oxides may stabilize the tetragonal phase, hence not all of the zirconium dioxide may phase change to the monoclinic crystal structure. The zirconium dioxide is then at partly or fully stabilized in its tetragonal phase at room temperature. This may provide a zirconium dioxide ceramic comprising beneficial properties of the tetragonal phase at room temperatures. It has been surprisingly found that the properties of partly or fully stabilized zirconia ceramics may be beneficial for providing writing balls for writing instruments.

Further, it has been surprisingly found that the addition of $Al_2O_3$ to stabilized zirconium dioxide ceramics may improve the properties of the ceramic writing ball. In particular, the addition of $Al_2O_3$ may reduce specific surface area of the ceramic writing ball. A writing ball with a low specific surface area may be beneficial for providing a writing instrument which can create sharp lines. Further, the addition of $Al_2O_3$ may increase the toughness and/or hardness of the ceramic writing ball. While increased toughness and/or hardness for a writing ball is desirable for durability, an increase in hardness may also lead to a longer grinding and polishing time during manufacturing of the writing ball. Hence, it may be relevant to obtain writing balls with balanced toughness and hardness. It may also be relevant to balance the amount of $Al_2O_3$ in the ceramic writing ball.

Accordingly, in a first aspect, the present disclosure relates to a writing instrument comprising a ceramic writing ball. The ceramic writing ball comprises relative to the total weight of the ceramic writing ball about 1.0 wt.-% to about 14.6 wt.-% of one or more metal oxides selected from $Y_2O_3$, HfO, MgO, CaO and/or $Ce_2O_3$. The ceramic writing ball comprises about 0.15 wt.-% to about 3.0 wt.-% $Al_2O_3$. The ceramic writing ball comprises $ZrO_2$ as balance.

The above-mentioned ranges may be especially beneficial for stabilization of $ZrO_2$. Metal oxide contents below those defined above may not sufficiently stabilize the $ZrO_2$ ceramics which may result in breakage of the writing ball upon cooling due to phase changes. At ranges above those defined above, the $ZrO_2$ may become unstable again or require a long sintering time. Without wishing to be bound theory, a high amount of metal oxides may stabilize the $ZrO_2$ to a degree that diffusion processes required for the sintering are slowed down.

The metal oxides may comprise a metal oxide from the second, third, fourth and/or thirteenth group of the periodic table. The second, third, fourth and/or thirteenth group of the periodic table are defined as per the IUPAC nomenclature. The ceramic writing ball comprises as one or more metal oxide $Y_2O_3$, HfO, MgO, CaO and/or $Ce_2O_3$. Metal oxides from the second, third, fourth and/or thirteenth group of the periodic table, in particular $Y_2O_3$, HfO, MgO, CaO and/or $Ce_2O_3$, may be especially advantageous in stabilizing the tetragonal phase of zirconium dioxide. Without wishing to be bound by theory, it is believed that the metal oxides may stabilize the $ZrO_2$ ceramics by substituting some of the $Zr^{4+}$ ions with slightly larger ions within the crystal lattice, for example with $Y^{3+}$ ions.

In some embodiments the ceramic writing ball may comprise between about 1.0 wt.-% to about 14.6 wt.-% of $Y_2O_3$, more specifically between about 3.0 wt.-% to about 10 wt.-% $Y_2O_3$, and in particular between about 4 wt.-% to about 6 wt.-% $Y_2O_3$. $Y_2O_3$ may be especially beneficial for obtaining stabilized $ZrO_2$ ceramics, in particular in regard to toughness and fracture toughness. Fracture toughness within this disclosure shall refer to a material's ability to resist further fracture when it already comprises a crack.

There are different types of stabilized zirconium dioxide. The obtained type of zirconium dioxide may primarily rely upon the type and amount of added metal oxide, other additives, and the temperature the material is heated to. For example, when adding $Y_2O_3$ the zirconium dioxide may present in the following forms as partly stabilized zirconia: partially stabilized zirconia (PSZ), tetragonal polycrystalline zirconia (TPZ), with 4 mol-% $Y_2O_3$ partially Stabilized zirconium dioxide (4YSZ). For example, when adding $Y_2O_3$ the zirconia may be present in the following forms as fully stabilized zirconia include fully stabilized zirconia (FSZ), cubic stabilized zirconia (CSZ), with 8 mol % $Y_2O_3$ fully stabilized zirconium dioxide (8YSZ) and 8-9 mol % $Y_2O_3$-doped $ZrO_2$. Higher temperatures may lead to ceramic writing balls comprising the cubic phase, whereas lower temperatures may result in ceramic writing balls comprising the tetragonal phase.

Embodiments wherein the ceramic writing ball comprises about 3 wt.-% to about 10 wt.-% may be especially advantageous. Further, embodiments wherein the ceramic writing ball comprises between about 4 wt.-% to about 6 wt.-% $Y_2O_3$ may be especially advantageous. This composition may form tetragonal polycrystalline zirconia. Tetragonal polycrystalline zirconia may have the highest toughness at room temperature. While it is important to balance the toughness and hardness of the writing ball, it may still be advantageous to have a basis of the toughest type of stabilized zirconia. Further, tetragonal polycrystalline zirconia may comprise the tetragonal phase in a metastable state. Without wishing to be bound by theory, applied stress may convert the tetragonal polycrystalline zirconia to its monoclinic crystal structure. In particular, if a crack occurs, applied stress may concentrate at the crack tip. At the crack tip the tetragonal polycrystalline zirconia may phase change to the monoclinic crystal structure. The phase change to monoclinic crystal structure may lead to the associated volume expansion. Due to the phase change the crack may be compressed and its growth retarded, which adds to the fracture toughness of the material. Fracture toughness may be a desirable property for a writing ball, as high forces may be applied to small surfaces during writing. Moreover, tetragonal polycrystalline zirconia may have the finest grain size. A finer grain size may allow obtaining a writing ball with a smaller specific surface area, in particular after grinding and polishing.

In some embodiments the ceramic writing ball may comprise between about 0.15 wt.-% to about 1.5 wt.-% of $Al_2O_3$, more specifically between about 0.15 wt.-% to about 0.7 wt.-% $Al_2O_3$, and in particular between about 0.15 wt.-% to about 0.35 wt.-% $Al_2O_3$. The aforementioned ranges of $Al_2O_3$ content may be beneficial for obtaining a ceramic writing ball with a balanced toughness and hardness. Increasing the $Al_2O_3$ content may increase the toughness and hardness of the ceramic writing ball. A ceramic writing ball having a high hardness may require a longer grinding and polishing duration to achieve a smooth surface. However, a ceramic writing ball having a low toughness may not withstand the applied forces during the writing action. As a result, it may be advantageous to balance the toughness and hardness of the writing ball by balancing the content of $Al_2O_3$. Further, the aforementioned ranges of $Al_2O_3$ content may be beneficial for obtaining a ceramic writing ball with a low specific surface area. Moreover, the addition of $Al_2O_3$ may reduce the required sintering temperature. Without wishing to be bound by theory, it is believed that the $ZrO_2$, metal oxide selected from $Y_2O_3$, HfO, MgO, CaO and/or $Ce_2O_3$ and $Al_2O_3$ may form a eutectic system which may sinter at lower temperatures. This may be relevant to reduce manufacturing costs, mode specifically energy costs, and may render the entire process more environmentally friendly.

In some embodiments the ceramic writing ball may have a specific surface area between about 4 $m^2/g$ to about 10 $m^2/g$, more specifically between about 5 $m^2/g$ to about 9 $m^2/g$ and in particular between about 6 $m^2/g$ to about 8 $m^2/g$. A ceramic writing ball with a low specific surface area, e.g., as those mentioned before, may be advantageous in that it may be less prone to clogging, in particular clogging caused by fiber intake or thickening of the ink, and/or may contribute to a smoother writing sensation to the user and more even writing. The specific surface area may be measured according to the standard ISO 18757:2003.

In some embodiments the ceramic writing ball may comprise at least about 60 wt.-% $ZrO_2$, more specifically at least about 70 wt.-% $ZrO_2$ and in particular at least about 80 wt.-% $ZrO_2$.

A ceramic writing ball comprising predominantly $ZrO_2$ may be especially corrosion resistant. Further, a ceramic writing ball comprising predominantly $ZrO_2$ may have a balanced toughness and hardness. A writing ball with balance toughness may be tough enough to be used for writing, while its production is efficient as the time required for grinding is lower than for writing ball made of a material with a higher hardness. Alternatively or additionally, a ceramic writing ball comprising predominantly $ZrO_2$ may not require the addition of cobalt. Cobalt and its salts may be toxic. The use of cobalt in writing instruments is thus a possible hazard for the user and/or the environment.

In some embodiments the ceramic writing ball may comprise less than about 40 wt.-% $Si_3N_4$, more specifically less than about 20 wt.-% $Si_3N_4$ and in particular less than about 5 wt.-% $Si_3N_4$. The addition of $Si_3N_4$ may destabilize the zirconium dioxide ceramic.

In some embodiments the ceramic writing ball may comprise less than about 40 wt.-% tungsten carbide, more specifically less than about 20 wt.-% tungsten carbide and in particular less than about 5 wt.-% tungsten carbide. The addition of tungsten carbide may destabilize the zirconium dioxide ceramic. Further, the addition of tungsten carbide may require the addition of cobalt.

In some embodiments the ceramic writing ball may essentially consist or consist of the following elements: about 1.0 wt.-% to about 14.6 wt.-% of a metal oxide selected from $Y_2O_3$, HfO, MgO, CaO and/or $Ce_2O_3$, about 0.15 wt.-% to about 3.0 wt.-% $Al_2O_3$, other elements, if present, in an amount of up to about 10 wt.-%, more specifically up to about 5 wt.-% and in particular up to about 3 wt.-%; and $ZrO_2$ as balance.

In some embodiments writing ball may comprise or consist of the following elements: about 1.0 wt.-% to about 14.6 wt.-% of a metal oxide selected from $Y_2O_3$, HfO, MgO, CaO and/or $Ce_2O_3$, about 0.15 wt.-% to about 3.0 wt.-% $Al_2O_3$, $SiO_2$, if present, in an amount of less than about 0.1 wt.-%, $Fe_2O_3$, if present, in an amount of less than about 0.1 wt.-%, $Na_2O$, if present, in an amount of less than about 0.1 wt.-%, other elements, if present, in an amount of less than about 3 wt.-%, and $ZrO_2$ as balance.

In some embodiments the ceramic writing ball may consist of the following elements: about 1.0 wt.-% to about 14.6 wt.-% of a metal oxide selected from $Y_2O_3$, HfO, MgO, CaO and/or $Ce_2O_3$, about 0.15 wt.-% to about 3.0 wt.-% $Al_2O_3$, $SiO_2$, if present, in an amount of less than about 0.1 wt.-%, $Fe_2O_3$, if present, in an amount of less than about 0.1 wt.-%, $Na_2O$, if present, in an amount of less than about 0.1 wt.-%, other elements, if present, in an amount of up to about 3 wt.-%; and $ZrO_2$ as balance.

In some embodiments the ceramic writing ball may consist of the following elements: about 1.0 wt.-% to about 14.6 wt.-%, more specifically about 3.0 wt.-% to about 10 wt.-%, and in particular about 4 wt.-% to about 6 wt.-%, of $Y_2O_3$; about 0.15 wt.-% to about 3.0 wt.-% $Al_2O_3$, $SiO_2$, if present, in an amount of less than about 0.1 wt.-%; $Fe_2O_3$, if present, in an amount of less than about 0.1 wt.-%; $Na_2O$, if present, in an amount of less than about 0.1 wt.-%; other elements, if present, in an amount of up to about 3 wt.-%; and $ZrO_2$ as balance.

The advantages for the defined ranges of metal oxides and $Al_2O_3$ described in the embodiments above are the same as those described above for the same ranges.

Further, a low content of $SiO_2$, $Fe_2O_3$ and/or $Na_2O$ may provide a ceramic with high corrosion resistance. Without wishing to be bound by theory, higher contents of these elements may make the ceramic more prone to intergranular corrosion within certain environments, e.g., in water-based inks.

In some embodiments the diameter of the ceramic writing ball may be between about 0.2 mm to about 2.5 mm, more specifically between about 0.4 mm to about 2.0 mm and in particular between about 0.6 mm to about 1.6 mm. Ceramic writing balls having the aforementioned diameters may be especially beneficial for writing instruments. Smaller diameters may lead to barely visible lines. Bigger diameters may result in lines considered too wide by many users.

Further, during the writing action, the user exerts a force upon the writing instrument, which leads to the writing ball being pressed against the paper. Writing balls are usually held by a socket within the writing instrument. A layer of ink usually provides lubrication between the writing ball and the socket. For ceramic writing balls with small diameters, the force may only be transferred along a small interface between the writing ball and socket. As a result, the layer of ink may be driven out, leading to friction between the small writing ball and the socket. This friction may lead to an uneven rotation of the writing ball and hence an inconsistent line. Further, the friction may damage both socket and writing ball. However, for a writing ball comprising a diameter exceeding the aforementioned ranges, the force applied may not be sufficient to overcome the frictional forces between writing ball, ink and socket, thereby also leading to an inconsistent line due to uneven rotation of the writing ball.

In some embodiments a surface of the ceramic writing ball may have a surface roughness Ra between about 1 nm to about 50 nm, more specifically between about 2 nm to about 30 nm, and in particular between about 10 nm to about 20 nm. The surface roughness may be measured by interferometry. The interferometry may be conducted with the device Zygo NewView 7100 sold by the company Zygo Corporation.

A ceramic writing ball having a low surface roughness, as defined by the aforementioned surface roughness ranges, may provide a writing ball providing sharp lines compared to a writing ball with higher roughness. A lower surface roughness may provide a sharper line as the writing ball's shape may be closer to a perfect spherical shape. Further, a writing ball with a lower roughness may not sufficiently transport the ink from the side facing away from the ink outlet to the writing surface. Due to the insufficient transport the writing ball may not dispose an even line on the writing surface. Further, a ceramic writing ball with an even lower surface roughness may not provide enough friction between writing ball and paper to rotate. If the friction is too low between writing ball and paper, the ball may not rotate evenly during the writing action, which may lead to an uneven line.

In some embodiments the ceramic writing ball may have a density between about 5.2 g/cm$^3$ to about 6.0 g/cm$^3$, more specifically 5.4 g/cm$^3$ to about 5.8 g/cm$^3$ and in particular between about 5.5 g/cm$^3$ to about 5.7 g/cm$^3$. The density may be measured according to the standard ISO 12154:2014.

In some embodiments the ceramic writing ball may have a hardness between about 1200 HV1 to about 1600 HV1, more specifically 1300 HV1 to about 1500 HV1 and in particular between about 1370 HV1 to about 1430 HV1. The hardness may be measured according to the standard ISO 14705:2016. The aforementioned hardness ranges may provide a ceramic writing ball with sufficient durability that is still grindable and polishable efficiently.

The Vickers hardness may be in particular measured according to the following protocol. First, for the sample preparation, the writing ball is embedded in a resin, for example in a combination of EpoMet and Phenocure, both purchasable from the company Buehler, Illinois, USA. Subsequently, the writing ball is ground and polished. The writing ball may be ground and polished with the following materials in a consecutive order, a diamond disc with a granulometry of 75 µm, an UltraPad cloth 9 µm, a VerduTex cloth 3 µm and a VerduTex cloth 1 µm. All grinding and polishing materials may be for example purchased from the company Buehler, Illinois, USA.

The embedded ball is then placed in a hardness tester, e.g. a Buehler MicroMet 5100. The writing ball is then indented with a diamond pyramid of the hardness tester with a load of 1 kg, resulting in a rectangular indentation. The two diagonals of the rectangle are subsequently measured by an optical microscope comprised within the Buehler MicroMet 5100 and the arithmetic mean of the two diagonals in millimeters is calculated. The Vickers hardness is then calculated by the following formula.

$$HV = 0.1891 \frac{load * g}{arithmethic\ mean\ of\ the\ diagonals}$$

In some embodiments the ceramic writing ball may comprise less than about 0.1 wt.-% SiO$_2$, more specifically less than about 0.05 wt.-% SiO$_2$, and in particular less than about 0.02 wt.-% SiO$_2$, relative to the total weight of the ceramic writing ball.

In some embodiments the ceramic writing ball may comprise less than about 0.1 wt.-% Fe$_2$O$_3$, more specifically less than about 0.05 wt.-% Fe$_2$O$_3$, and in particular less than about 0.01 wt.-% Fe$_2$O$_3$, relative to the total weight of the ceramic writing ball.

In some embodiments the ceramic writing ball may comprise less than about 0.1 wt.-% Na$_2$O, more specifically less than about 0.07 wt.-% Na$_2$O, and in particular less than about 0.04 wt.-% Na$_2$O, relative to the total weight of the ceramic writing ball.

As mentioned above, a low content of SiO$_2$, Fe$_2$O$_3$ or Na$_2$O may provide a ceramic with low corrosion. Without wishing to be bound by theory, higher contents of these elements may lead to intergranular corrosion within certain environments, e.g., in water-based inks.

In some embodiments the ceramic writing ball may be corrosion resistant to water-based liquids and in particular corrosion resistant to water-based inks.

The term "corrosion" within this disclosure shall refer to a degradation of useful material properties or more generally a material degradation, e.g., loss in strength or increase in specific surface area. While the term "corrosion" is commonly associated with metals, it may also refer to the material degradation of ceramics. The term "corrosion resistant" within this disclosure may in particular refer to the absence of significant material degradation during the lifetime of an item. Significant material degradation shall be considered as degradation that reduces the functionality of the item. For example, significant material degradation of a writing ball may lead to an increase of friction between the writing ball and the socket. The degradation may be considered significant when the writing ball starts moving in a stop and go motion. The lifetime of a writing ball within a writing instrument with a permanently installed ink cartridge may be defined as a writing length up to about 2000 m and/or a storage duration of about 3 years. The lifetime of a writing ball within a writing instrument with exchangeable ink cartridges may be about 20.000 m and/or a storage duration up to about 10 years. Corrosion may be tested by accelerated methods known in the art, e.g., by potentiometric methods in saline solutions.

In some embodiments the ceramic writing ball may be corrosion resistant to oil-based liquids and in particular corrosion resistant to oil-based inks.

In some embodiments the ceramic writing ball may be corrosion resistant to solvent-based liquid and in particular corrosion resistant to solvent-based inks.

As mentioned above, corrosion resistance may be an advantage of ceramic writing balls, in particular ceramic writing balls comprising predominantly ZrO$_2$. Further, it may be beneficial that the ceramic writing ball is corrosion resistant in different media. A ceramic writing ball corrosion resistant in water-based, oil-based and solvent-based inks may be especially beneficial as it can be used with all generally available inks. A ceramic writing boil corrosion resistant in almost any ink may be beneficial, as it could be used and produced in larger quantities, which may reduce production costs of the writing ball and/or writing instrument.

In some embodiments the writing instrument may comprise a writing tip in which the ceramic writing ball is rotatably inserted.

In some embodiments the writing instrument may comprise an ink compartment.

In some embodiments the ink compartment may comprise an aqueous ink.

In some embodiments the ink compartment may comprise a non-aqueous ink.

In some embodiments the ink compartment may be in fluid connection with the ink outlet. The writing ball may be positioned within the ink outlet. The ink may move from the ink compartment to the ink outlet. The ink may then wet the writing ball on the proximal side of the writing instrument.

In some embodiments the ink compartment may be an ink cartridge, in particular a removable ink cartridge. A writing instrument comprising a ceramic writing ball and a removable ink cartridge may be especially advantageous. As the ceramic writing ball may be corrosion resistant in different media, it may allow using the same ballpoint pen with different ink cartridges, in particular ink cartridges comprising different types of inks, e.g., aqueous inks and non-aqueous inks.

In some embodiments the writing instrument may comprise a cap. The writing instrument may require a cap if solvent or oil-based inks are used, as these may be prone to drying out. The cap may prevent drying out of the writing instrument ink.

According to a second aspect, the present disclosure relates to a process for manufacturing a ceramic writing ball. The process comprises pressing a powder mixture into a spherical shape to obtain a raw pellet. Subsequently, heating the raw pellet to a temperature between about 400° C. to about 750° C., more specifically between about 450° C. to about 700° C. and in particular between 500° C. to about 600° C., for about 1 to about 3 hours, more specifically for about 1.5 to about 2.5 hours, and in particular for about 1.8 to about 2.2 hours, to obtain a pre-sintered pellet.

The pre-sintered pellet is sintered at a temperature of between about 1300° C. to about 1550° C., more specifically between about 1400° C. to about 1500° C. and in particular between 1430° C. to about 1480° C., for about 1 to about 3 hours, more specifically for about 1.5 to about 2.5 hours, and in particular for about 1.8 to about 2.2 hours, to obtain a sintered pellet. The sintered pellet is ground to obtain a proto writing ball. The proto writing ball is polished to obtain a writing ball. The proto writing ball may also be referred to as a rough writing ball.

The process for manufacturing described above may be advantageous compared to processes used to produce writing balls from other materials. In particular, the temperatures used may be lower than for processing other ceramics, including zirconium dioxide ceramics not comprising $Al_2O_3$. The lower temperatures may save energy. Further, the process described above may result in a ceramic writing ball comprising tetragonal polycrystalline zirconia which may be beneficial for manufacturing a writing ball as described above. Moreover, the process described above may lead to a ceramic writing ball with a lower specific surface area. Without wishing to be bound by theory, the lower specific surface area may result from a higher density, which may be the result of lower temperatures used within the process. A higher density may result in lower specific surface area, as less voids and/or pores are present. Without wishing to be bound by theory, higher temperatures during sintering may lead to zirconium dioxide ceramics with lower density because the grain growth is increased. The increased grain growth may lead to fewer but bigger grains, which may not fill space as efficiently as more, but fewer grains would. Longer holding times may also lead to fewer but bigger grains. Shorter holding times and/or lower temperatures than those described above may result in an insufficiently sintered ceramic writing ball, which may not be mechanically stable.

In some embodiments the powder mixture may have an average particle size about 0.1 μm and about 5 μm, more specifically between about 0.2 μm and about 1 μm and in particular between 0.4 μm and about 0.8 μm. The aforementioned ranges for the particle size may be beneficial for providing a ceramic writing ball with a low specific surface area.

In some embodiments the powder mixture may have an average granule size of about 5 μm to about 300 μm, more specifically between about 10 μm to about 200 μm and in particular between 40 μm to about 80 μm. The aforementioned ranges for the average granule size may be beneficial for providing a ceramic writing ball with a low specific surface area.

Further embodiments disclosed in the first aspect are equally applicable to this aspect.

In a third aspect, the present disclosure relates to a ceramic writing ball. The ceramic writing ball may comprise relative to the total weight of the ceramic writing ball about 1.0 wt.-% to about 14.6 wt.-% of a metal oxide, more specifically selected from $Y_2O_3$, HfO, MgO, CaO and/or $Ce_2O_3$, about 0.15 wt.-% to about 0.35 wt.-% $Al_2O_3$, and $ZrO_2$ as balance.

Embodiments disclosed in the first aspect are equally applicable to this aspect.

Example 1

An exemplary writing ball was prepared using a powder mixture with a composition as presented in Table 1. The powder mixture had an average particle size of about 1 μm and a granule size between about 20 μm to about 130 μm. The powder mixture was then placed into a mold and compressed to obtain a raw pellet. The raw pellet was then placed within the mold into an oven at a temperature of about 550° C. for 2 hours to obtain a pre-sintered pellet. Subsequently, the pre-sintered pellet was heated to a temperature of about 1450° C. for 2 hours to obtain a sintered pellet. The sintered pellet then underwent grinding and polishing to obtain a writing ball.

TABLE 1

| Powder mixture of example 1 | |
|---|---|
| Component | Amount (wt.-%) |
| $Y_2O_3$ | 5.15 |
| $Al_2O_3$ | 0.25 |
| $SiO_2$ | <=0.02 |
| $Fe_2O_3$ | <=0.01 |
| $Na_2O$ | <=0.04 |
| $ZrO_2$ | Balance (~94.5) |

The writing ball's specific surface area was measured according to ISO 18757:2003 and determined to be about 7.1 m²/g. Further, the hardness of the ball was measured according to ISO 14705:2016 and determined to be about 1390 HV1.

Aspects

1. In a first aspect the present disclosure relates to a writing instrument comprising:
   a ceramic writing ball,
   wherein the ceramic writing ball comprises relative to the total weight of the ceramic writing ball:
   about 1.0 wt.-% to about 14.6 wt.-% of one or more metal oxides selected from $Y_2O_3$, HO, MgO, CaO and/or $Ce_2O_3$,
   about 0.15 wt.-% to about 3.0 wt.-% $Al_2O_3$,
   and $ZrO_2$ as balance.
2. The writing instrument according to preceding aspect 1, wherein the ceramic writing ball comprises between about 1.0 wt.-% to about 14.6 wt.-% of $Y_2O_3$, more specifically between about 3.0 wt.-% to about 10 wt.-% $Y_2O_3$, and in particular between about 4 wt.-% to about 6 wt.-% $Y_2O_3$.
3. The writing instrument according to any preceding aspect,
wherein the ceramic writing ball comprises between about 0.15 wt.-% to about 1.5 wt.-% of $Al_2O_3$, more specifically between about 0.15 wt.-% to about 0.7 wt.-% $Al_2O_3$, and in particular between about 0.15 wt.-% to about 0.35 wt.-% $Al_2O_3$.
4. The writing instrument according to any preceding aspect, wherein the ceramic writing ball has a specific surface area between about 4 $m^2/g$ to about 10 $m^2/g$, more specifically between about 5 $m^2/g$ to about 9 $m^2/g$ and in particular between about 6 $m^2/g$ to about 8 $m^2/g$.
5. The writing instrument according to any preceding aspect, wherein the ceramic writing ball comprises at least about 60 wt.-% $ZrO_2$, more specifically at least about 70 wt.-% $ZrO_2$ and in particular at least about 80 wt.-% $ZrO_2$.
6. The writing instrument according to any preceding aspect, wherein the ceramic writing ball comprises less than about 40 wt.-% $Si_3N_4$, more specifically less than about 20 wt.-% $Si_3N_4$ and in particular less than about 5 wt.-% $Si_3N_4$.
7. The writing instrument according to any preceding aspect, wherein the ceramic writing ball comprises less than about 40 wt.-% tungsten carbide, more specifically less than about 20 wt.-% tungsten carbide and in particular less than about 5 wt.-% tungsten carbide.
8. The writing instrument according to any preceding aspect,
wherein the ceramic writing ball essentially consists or consists of the following elements:
about 1.0 wt.-% to about 14.6 wt.-% of a metal oxide, about 0.15 wt.-% to about 3.0 wt.-% $Al_2O_3$,
other elements, if present, in an amount of up to about 10 wt.-%, more specifically up to about 5 wt.-% and in particular up to about 3 wt.-%;
and $ZrO_2$ as balance.
9. The writing instrument according to any one of aspects 1 to 7,
wherein the ceramic writing ball comprises or consists of the following elements:
about 1.0 wt.-% to about 14.6 wt.-% of a metal oxide selected from $Y_2O_3$, HfO, MgO, CaO and/or $Ce_2O_3$, about 0.15 wt.-% to about 3.0 wt.-% $Al_2O_3$.
$SiO_2$, if present, in an amount of less than about 0.1 wt.-%,
$Fe_2O_3$, if present, in an amount of less than about 0.1 wt.-%,
$Na_2O$, if present, in an amount of less than about 0.1 wt.-%,
other elements, if present, in an amount of less than about 3 wt.-%,
and $ZrO_2$ as balance.
10. The writing instrument according to any one of aspects 1 to 7,
wherein the ceramic writing ball consists of the following elements:
about 1.0 wt.-% to about 14.6 wt.-% of a metal oxide selected from $Y_2O_3$, HfO, MgO, CaO and/or $Ce_2O_3$, about 0.15 wt.-% to about 3.0 wt.-% $Al_2O_3$,
$SiO_2$, if present, in an amount of less than about 0.1 wt.-%,
$Fe_2O_3$, if present, in an amount of less than about 0.1 wt.-%,
$Na_2O$, if present, in an amount of less than about 0.1 wt.-%,
other elements, if present, in an amount of up to about 3 wt.-%;
and $ZrO_2$ as balance.
11. The writing instrument according to any one of aspects 1 to 7,
wherein the ceramic writing ball consists of the following elements:
about 1.0 wt.-% to about 14.6 wt.-%, more specifically about 3.0 wt.-% to about 10 wt.-%, and in particular about 4 wt.-% to about 6 wt.-%, of $Y_2O_3$;
about 0.15 wt.-% to about 3.0 wt.-% $Al_2O_3$;
$SiO_2$, if present, in an amount of less than about 0.1 wt.-%;
$Fe_2O_3$, if present, in an amount of less than about 0.1 wt.-%;
$Na_2O$, if present, in an amount of less than about 0.1 wt.-%;
other elements, if present, in an amount of up to about 3 wt.-%;
and $ZrO_2$ as balance.
12. The writing instrument according to any preceding aspect, wherein the diameter of the ceramic writing ball is between about 0.2 mm to about 2.5 mm, more specifically between about 0.4 mm to about 2.0 mm and in particular between about 0.6 mm to about 1.6 mm.
13. The writing instrument according to any preceding aspect, wherein a surface of the ceramic writing ball has a surface roughness Ra between about 1 nm to about 50 nm, more specifically between about 2 nm to about 30 nm, and in particular between about 10 nm to about 20 nm.
14. The writing instrument according to any preceding aspect, wherein the ceramic writing ball has a density between about 5.2 $g/cm^3$ to about 6.0 $g/cm^3$, more specifically 5.4 $g/cm^3$ to about 5.8 $g/cm^3$ and in particular between about 5.5 $g/cm^3$ to about 5.7 $g/cm^3$.
15. The writing instrument according to any preceding aspect, wherein the ceramic writing ball has a hardness between about 1200 HV1 to about 1600 HV1, more specifically 1300 HV1 to about 1500 HV1 and in particular between about 1370 HV1 to about 1430 HV1, according to the standard ISO 14705:2016.
16. The writing instrument according to any preceding aspect, wherein the ceramic writing ball comprises less than about 0.1 wt.-% $SiO_2$, more specifically less than about 0.05 wt.-% $SiO_2$, and in particular less than about 0.02 wt.-% $SiO_2$, relative to the total weight of the ceramic writing ball.
17. The writing instrument according to any preceding aspect, wherein the ceramic writing ball comprises less than about 0.1 wt.-% $Fe_2O_3$, more specifically less than about 0.05 wt.-% $Fe_2O_3$, and in particular less than about 0.01 wt.-% $Fe_2O_3$, relative to the total weight of the ceramic writing ball.
18. The writing instrument according to any preceding aspect, wherein the ceramic writing ball comprises less than about 0.1 wt.-% $Na_2O$, more specifically less than about 0.07 wt.-% $Na_2O$, and in particular less than about 0.04 wt.-% $Na_2O$, relative to the total weight of the ceramic writing ball.
19. The writing instrument according to any preceding aspect, wherein the ceramic writing ball is corrosion resistant to water-based liquids and in particular corrosion resistant to water-based inks.

20. The writing instrument according to any preceding aspect, wherein the ceramic writing ball is corrosion resistant to oil-based liquids and in particular corrosion resistant to oil-based inks.
21. The writing instrument according to any preceding aspect, wherein the ceramic writing ball is corrosion resistant to solvent-based liquid and in particular corrosion resistant to solvent-based inks.
22. The writing instrument according to any preceding claim, wherein the writing instrument comprises a writing tip in which the ceramic writing ball is rotatably inserted.
23. The writing instrument according to any preceding aspect, wherein the writing instrument comprises an ink compartment.
24. The writing instrument according to aspect 23, wherein the ink compartment comprises an aqueous ink.
25. The writing instrument according to aspect 23, wherein the ink compartment comprises a non-aqueous ink.
26. The writing instrument according to any one of aspects 23 to 25, wherein the ink compartment is in fluid connection with the ink outlet.
27. The writing instrument according to any one of aspects 23 to 26, wherein the ink compartment is an ink cartridge, in particular a removable ink cartridge.
28. The writing instrument according to any preceding claim, wherein the writing instrument comprises a cap.
29. In a second aspect the present disclosure relates to a process for manufacturing a ceramic writing ball according to any preceding aspect, wherein the process comprises:
    pressing a powder mixture into a spherical shape to obtain a raw pellet;
    heating the raw pellet to a temperature between about 400° C. to about 750° C., more specifically between about 450° C. to about 700° C. and in particular between 550° C. to about 550° C., for about 1 to about 3 hours, more specifically for about 1.5 to about 2.5 hours, and in particular for about 1.8 to about 2.2 hours, to obtain a pre-sintered pellet;
    sintering the pre-sintered pellet at a temperature of between about 1300° C. to about 1550° C., more specifically between about 1400° C. to about 1500° C. and in particular between 1430° C. to about 1480° C., for about 1 to about 3 hours, more specifically for about 1.5 to about 2.5 hours, and in particular for about 1.8 to about 2.2 hours, to obtain a sintered pellet;
    grinding the sintered pellet to obtain a proto writing ball;
    polishing the proto writing ball to obtain a writing ball.
30. The process of aspect 29, wherein the powder mixture has an average particle size about 0.1 µm and about 5 µm, more specifically between about 0.2 µm and about 1 µm and in particular between 0.4 µm and about 0.8 µm.
31. The process of aspects 29 or 30, wherein the powder mixture has an average granule size of about 5 µm to about 300 µm, more specifically between about 10 µm to about 200 µm and in particular between 40 µm to about 80 µm.
32. In a third aspect the present disclosure relates to a ceramic writing ball,
    wherein the ceramic writing ball comprises relative to the total weight of the ceramic writing ball:
    about 1.0 wt.-% to about 14.6 wt.-% of a metal oxide, more specifically selected from $Y_2O_3$, HfO, MgO, CaO and/or $Ce_2O_3$,
    about 0.15 wt.-% to about 0.35 wt.-% $Al_2O_3$,
    and $ZrO_2$ as balance.

The invention claimed is:

1. A writing instrument comprising:
   a ceramic writing ball,
   wherein the ceramic writing ball comprises relative to the total weight of the ceramic writing ball:
   about 1.0 wt.-% to about 14.6 wt.-% of $Y_2O_3$, HfO, MgO, CaO and/or $Ce_2O_3$,
   about 0.15 wt.-% to about 3.0 wt.-% $Al_2O_3$, and
   $ZrO_2$ as balance.
2. The writing instrument according to claim 1, wherein the ceramic writing ball comprises between about 1.0 wt.-% to about 14.6 wt.-% of $Y_2O_3$.
3. The writing instrument according to claim 1, wherein the ceramic writing ball comprises between about 3.0 wt.-% to about 10 wt.-% $Y_2O_3$.
4. The writing instrument according to claim 1, wherein the ceramic writing ball comprises between about 4 wt.-% to about 6 wt.-% $Y_2O_3$.
5. The writing instrument according to claim 1, wherein the ceramic writing ball comprises between about 0.15 wt.-% to about 1.5 wt.-% of $Al_2O_3$.
6. The writing instrument according to claim 1, wherein the ceramic writing ball comprises between about 0.15 wt.-% to about 0.7 wt.-% $Al_2O_3$.
7. The writing instrument according to claim 1, wherein the ceramic writing ball comprises between about 0.15 wt.-% to about 0.35 wt.-% $Al_2O_3$.
8. The writing instrument according to claim 1, wherein the ceramic writing ball has a specific surface area between about 4 $m^2/g$ to about 10 $m^2/g$.
9. The writing instrument according to claim 1, wherein the ceramic writing ball has a specific surface area between about 5 $m^2/g$ to about 9 $m^2/g$.
10. The writing instrument according to claim 1, wherein the ceramic writing ball has a specific surface area between about 6 $m^2/g$ to about 8 $m^2/g$.
11. The writing instrument according to claim 1, wherein the ceramic writing ball comprises at least about 60 wt.-% $ZrO_2$.
12. The writing instrument according to claim 1, wherein the ceramic writing ball comprises at least about 70 wt.-% $ZrO_2$.
13. The writing instrument according to claim 1, wherein the ceramic writing ball comprises at least about 80 wt.-% $ZrO_2$.
14. The writing instrument according to claim 1,
    wherein the ceramic writing ball essentially consists or consists of the following elements:
    about 1.0 wt.-% to about 14.6 wt.-% of a metal oxide,
    about 0.15 wt.-% to about 3.0 wt.-% $Al_2O_3$,
    other elements, if present, in an amount of up to about 10 wt.-%
    and $ZrO_2$ as balance.
15. The writing instrument according to claim 1,
    wherein the ceramic writing ball consists of the following elements:
    about 1.0 wt.-% to about 14.6 wt.-% of $Y_2O_3$;
    about 0.15 wt.-% to about 3.0 wt.-% $Al_2O$;
    $SiO_2$, if present, in an amount of less than about 0.1 wt.-%;
    $Fe_2O_3$, if present, in an amount of less than about 0.1 wt.-%;

Na$_2$O, if present, in an amount of less than about 0.1 wt.-%;

other elements, if present, in an amount of up to about 3 wt.-%;

and ZrO$_2$ as balance.

16. The writing instrument according to claim 1, wherein a surface of the ceramic writing ball has a surface roughness Ra between about 1 nm to about 50 nm.

17. The writing instrument according to claim 1, wherein the ceramic writing ball has a density between about 5.2 g/cm$^3$ to about 6.0 g/cm$^3$.

18. The writing instrument according to claim 1, wherein the ceramic writing ball has a hardness between about 1200 HV1 to about 1600 HV1, according to the standard ISO 14705:2016.

19. A process for manufacturing a ceramic writing ball according to claim 1, wherein the process comprises:

pressing a powder mixture into a spherical shape to obtain a raw pellet;

heating the raw pellet to a temperature between about 400° C. to about 750° C., for about 1 to about 3 hours, to obtain a pre-sintered pellet;

sintering the pre-sintered pellet at a temperature of between about 1300° C. to about 1550° C., for about 1 to about 3 hours, to obtain a sintered pellet;

grinding the sintered pellet to obtain a proto writing ball; and polishing the proto writing ball to obtain a writing ball.

20. A ceramic writing ball, wherein the ceramic writing ball comprises relative to the total weight of the ceramic writing ball:

about 1.0 wt.-% to about 14.6 wt.-% of a metal oxide selected from Y$_2$O$_3$, HfO, MgO, CaO and/or Ce$_2$O$_3$, about 0.15 wt.-% to about 0.35 wt.-% Al$_2$O$_3$, and ZrO$_2$ as balance.

* * * * *